United States Patent Office 3,182,030
Patented May 4, 1965

3,182,030
CORE BINDER COMPOSITION COMPRISING SUGAR, GUM ARABIC, UREA FORMALDEHYDE RESIN AND BORIC ACID
Eric Parkes, Olton, Solihull, England, assignor to Foseco Fordath AG, Zug, Switzerland, a Swiss company
No Drawing. Filed Aug. 4, 1961, Ser. No. 129,238
Claims priority, application Great Britain, Aug. 6, 1960, 27,351/60
7 Claims. (Cl. 260—17.3)

This invention relates to binders for use in forming cores and moulds for use in the subsequent production of metal castings and is principally concerned with binders used for producing such cores and moulds in a heated mould or core box.

This process consists of introducing, usually by blowing, the mixed sand into a heated box, which will produce the final shape of the core or mould. After a length of time necessary for the curing of the resin the core or mould is removed from the box, in a condition suitable for immediate use.

Examples of binders commonly used for moulding or core making in a heated pattern or hot-box are phenolics, novolacs and furfurylated phenol, or urea formaldehyde resins and in normal practice in the case of shell moulding they take about 20–30 seconds or even longer to harden sufficiently for the shells to be stripped from the pattern plate.

Such binders also have the drawback of giving rise to objectionable formaldehyde fumes during stoving and the liquid phenolics may have a solvent such as alcohol included, which is evolved when the resin is heated, giving rise to fire risks. Also some liquid resins which are commonly used already contain 40–50% water and so they are preferably used with dry sand to avoid the necessity of a long heating period to dry off the moisture from both the resin and sand if the sand used is wet.

The object of the present invention is to provide an improved binder which overcomes or reduces the above disadvantages, and which has further advantages which will be pointed out in the following description.

According to the present invention I provide a binder for moulding sand comprising in predetermined proportions a mixture of sugar, gum arabic, boric acid, powdered urea formaldehyde resin and paraffin.

The curing properties of the mixture may be improved by the addition of ammonium sulphate or ammonium nitrate.

Preferably the constitutents of the binder are present within the following range of properties by weight:

| | |
|---|---|
| Sugar | 20–50%. |
| Gum arabic | 10–50%. |
| Powdered urea formaldehyde resin | 10–25%. |
| Boric acid | 3–8%. |
| Ammonium sulphate or nitrate | 1–3%. |
| Paraffin | 0–5%, preferably below 1%. |

In use the binder will be mixed with a suitable moulding sand, the binder constituting 1 to 4% by weight of the whole. Water is required in the mixture in order to generate the binding properties. The water should be present in an amount between 1½ to 5% by weight of the whole, and may either be added to the sand or may already be present by virtue of the sand being moist.

The binder sand and any water necessary are mixed in a normal mixing vessel and, in accordance with normal core making technique, the mixture is blown into the cavity between the backing plate and the pattern plate both of which may be heated, or in the case of cores, into a heated core box.

To effect optimum curing the box temperature should be between 400° F. and 650° F.

When using a mixture containing 3% binder and 3% water it was found that cores 1 inch in section were cured in 20 seconds at a temperature of 450 to 500° F., and in 15 seconds at a temperature of 600° F.

A suitable composition of binder for use in moulds and cores for producing steel castings has been found to be as follows:

| | Percent |
|---|---|
| Sugar | 41.7 |
| Gum arabic | 39.3 |
| Powdered urea formaldehyde resin | 12.1 |
| Boric acid | 4.0 |
| Ammonium sulphate | 2.0 |
| Paraffin | 0.9 |

For the production of castings in brass, bronze aluminum or grey iron a suitable composition is as follows:

| | Percent |
|---|---|
| Sugar | 39.6 |
| Gum arabic | 34.3 |
| Powdered urea formaldehyde resin | 17.1 |
| Boric acid | 6.1 |
| Ammonium sulphate | 2.0 |
| Paraffin | 0.9 |

The presence of sugar and gum arabic with the resin provides several notable advantages over conventional resin binders. The strength of the cured mould or core is as great, if not greater and the amount of gas and fumes evolved when the metal is poured into the mould is reduced. Moreover any re-action between the metal and the mold is reduced in extent and the surface finish of the casting is consequently better. The curing time is no longer, possibly even shorter than that of conventional binders.

The paraffin serves as a green binder for the powdered solids, and the boric acid acts as a catalyst to accelerate the cure of the resin. The optional constituent, ammonium sulphate or nitrate, has an acid re-action with the sugar to form a resinous adjunct which further increases the strength and also slightly shortens the curing time.

Further important advantages of the binder are that it is considerably cheaper than those previously proposed for shell moulding, and that it is not necessary for the sand to have been dried before use. Also transport of the binder is considerably easier than that of liquid binders.

What I claim is:
1. A dry binder of comminuted form for molding sand comprising a mixture of sugar, gum arabic, boric acid, powdered urea-formaldehyde resin and paraffin, the constituents being present within the following range of proportions by weight:

| | Percent |
|---|---|
| Sugar | 20 to 50 |
| Gum arabic | 10 to 50 |
| Powdered urea-formaldehyde resin | 10 to 25 |
| Boric acid | 3 to 8 |
| Paraffin | 0 to 5 |

2. A dry binder of comminuted form for molding sand comprising a mixture of sugar, gum arabic, boric acid, powdered urea-formaldehyde resin and paraffin, the constituents being at present within the following range of proportions by weight:

| | Percent |
|---|---|
| Sugar | 20 to 50 |
| Gum arabic | 10 to 50 |
| Powdered urea-formaldehyde resin | 10 to 25 |
| Boric acid | 3 to 8 |
| Paraffin | 0 to 5 |
| Ammonium sulphate | 1 to 3 |

3. A dry binder of comminuted form as claimed in claim 1, the mixture also containing ammonium nitrate in an amount between 1% and 3% by weight of the whole.

4. A dry binder of comminuted form for molding sand and for use in molds and cores for producing steel castings, wherein the constituents are present in approximately the following proportions by weight:

| | Percent |
|---|---|
| Sugar | 41.7 |
| Gum arabic | 39.3 |
| Powdered urea-formaldehyde resin | 12.1 |
| Boric acid | 4 |
| Ammonium sulphate | 2 |
| Paraffin | 0.9 |

5. A dry binder of comminuted form for use with molding sand and for molds and cores for the production of castings in a metal selected from the group consisting of brass, bronze, aluminum and grey iron wherein the constituents are present in approximately the following proportion by weight:

| | Percent |
|---|---|
| Sugar | 39.6 |
| Gum arabic | 34.3 |
| Powdered urea-formaldehyde resin | 17.1 |
| Boric acid | 6.1 |
| Ammonium sulphate | 2 |
| Paraffin | 0.9 |

6. A mixture of molding sand, water and a dry binder of comminuted form for forming cores and molds for use in the production of metal castings, the constituents being present within the following range of proportions by weight:

| | Percent |
|---|---|
| Molding sand | 91 to 97½ |
| Water | 1½ to 5 |
| Binder | 1 to 4 | the said binder consisting of the following constituents present within the following range of proportions by weight:

| | Percent |
|---|---|
| Sugar | 20 to 50 |
| Gum arabic | 10 to 50 |
| Powdered urea-formaldehyde resin | 10 to 25 |
| Boric acid | 3 to 8 |
| Paraffin | 0 to 5 |

7. A mixture as claimed in claim 6 wherein the constituents are present in approximately the following proportions by weight:

| | Percent |
|---|---|
| Molding sand | 94 |
| Water | 3 |
| Binder | 3 |

References Cited by the Examiner
UNITED STATES PATENTS

| 2,098,083 | 11/37 | Bowen et al. | 260—17.3 |
| 2,314,308 | 3/43 | Ellis et al. | 260—17.3 |
| 2,700,619 | 1/55 | Sullivan et al. | 260—17.3 |
| 2,765,507 | 10/56 | Wolf et al. | 260—17.3 |
| 2,888,418 | 5/59 | Albanese et al. | 260—28 |
| 2,972,587 | 2/61 | Berry | 260—17.3 |

JOSEPH L. SCHOFER, *Primary Examiner.*

WILLIAM H. SHORT, *Examiner.*